United States Patent
Vermeersch et al.

(10) Patent No.: US 11,118,673 B1
(45) Date of Patent: Sep. 14, 2021

(54) ELECTRONIC PARK LOCK SOLENOID NOISE DAMPENER

(71) Applicant: Steering Solutions IP Holding Corporation, Saginaw, MI (US)

(72) Inventors: Michael C. Vermeersch, Flushing, MI (US); Christopher F. Watz, Bay City, MI (US); Jason L. Myers, Mt. Morris, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/996,260

(22) Filed: Aug. 18, 2020

(51) Int. Cl.
*F16H 59/02* (2006.01)
*G05G 5/04* (2006.01)

(52) U.S. Cl.
CPC ........... *F16H 59/0278* (2013.01); *G05G 5/04* (2013.01); *F16H 2059/0282* (2013.01)

(58) Field of Classification Search
CPC ......... F16H 59/0278; F16H 2059/0282; F16H 61/22; F16H 2061/223; B60R 25/066; G05G 5/04
See application file for complete search history.

(56) References Cited

U.S. PATENT DOCUMENTS

| | | | | |
|---|---|---|---|---|
| 5,685,405 | A * | 11/1997 | Morikawa | F16H 61/22 192/220.2 |
| 7,189,186 | B2 * | 3/2007 | Weber | F16H 59/10 188/163 |
| 9,360,108 | B2 | 6/2016 | Pfenninger et al. | |
| 10,458,542 | B2 * | 10/2019 | Shogren | F16H 61/22 |

* cited by examiner

*Primary Examiner* — Adam D Rogers
(74) *Attorney, Agent, or Firm* — Dickinson Wright PLLC

(57) ABSTRACT

A brake transmission shift interlock (BTSI) solenoid includes a solenoid housing having an inner surface defining a lock pin cavity. The solenoid also includes a lock pin positioned within the lock pin cavity, the lock pin moveable between a first position and a second position. The solenoid further includes a bumper protruding into the lock pin cavity and stationary relative to the lock pin, the bumper defining the first position of the lock pin.

20 Claims, 9 Drawing Sheets

ELECTRONIC PARK LOCK SOLENOID NOISE DAMPENER

BACKGROUND

A gear shift lever lock solenoid may be implemented in a vehicle as a brake transmission shift interlock (BTSI) solenoid. The BTSI solenoid includes a lock pin that inhibits a gear shift lever from shifting out of a PARK position unless a brake of the vehicle is depressed. Prior assemblies rely on an O-ring to provide noise dampening during actuation. The O-ring is attached to the lock pin and translates axially with the lock pin during normal usage. A moving O-ring would be coupled with other functions, which could result in sensitivity to variation or reduced efficiency.

SUMMARY OF THE DISCLOSURE

According to one aspect of the disclosure, a brake transmission shift interlock (BTSI) solenoid includes a solenoid housing having an inner surface defining a lock pin cavity. The BTSI solenoid also includes a lock pin positioned within the lock pin cavity, the lock pin moveable between a first position and a second position. The BTSI solenoid further includes a bumper protruding into the lock pin cavity and stationary relative to the lock pin, the bumper defining the first position of the lock pin.

According to another aspect of the disclosure, a gear shift lock system includes a gear shift lock device. The gear shift lock device includes a gear shift lever assembly. The gear shift lock device also includes a solenoid housing having an inner surface defining a lock pin cavity. The gear shift lock device further includes a lock pin positioned within the lock pin cavity, the lock pin moveable between a first position and a second position. The gear shift lock device yet further includes a bumper protruding into the lock pin cavity and stationary relative to the lock pin, the bumper defining the first position of the lock pin. The gear shift lock device also includes a park position sensor configured to detect movement of the gear shift lever assembly. The gear shift lock system also includes a brake sensor configured to detect when a brake pedal is depressed. The gear shift lock system further includes a controller connected to the lock solenoid and the brake sensor, the controller configured to move the lock pin from the first position to the second position in response to receiving a first signal from the brake sensor indicating the brake pedal is depressed and a second signal from the park position sensor while the brake pedal is indicated as depressed.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, FIGS. 1-9 illustrate an example of a gear shift lock system including a gear shift lock device having a lock solenoid to inhibit a gear shift lever from moving out of a park position and a method of operating the gear shift lock solenoid.

Figure 1:
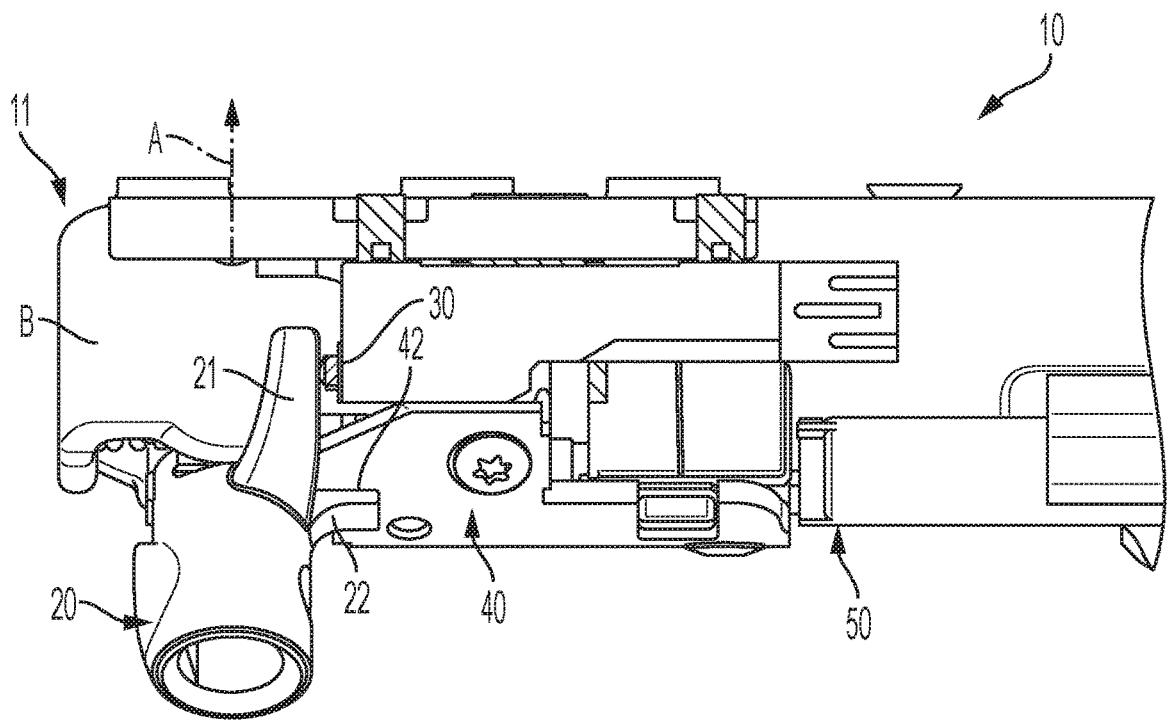
FIG. 1 illustrates a gear shift lock device with a gear shift lever adapter in a resting position.

With reference to FIG. 1, the gear shift lock system 10 includes a gear shift lock device 11. In an embodiment, the gear shift lock device 11 includes a gear shift lever adapter 20, a park position sensor 30, a detent plate 40 and a lock solenoid 50.

The gear shift lever adapter 20 is connected to a gear shift lever 25 (FIG. 4) such that the gear shift lever adapter 20 moves with the gear shift lever 25. The gear shift lever 25 is configured to be operated to move between different selected gear positions corresponding to different gears of a vehicle transmission. Thus, the gear shift lever adapter 20 moves with the gear shift lever 25 as the gear shift lever is moved to the different selected gear positions. It is understood that the gear shift lever 25 and gear shift lever adapter 20 may be formed as a single, integral piece, or alternatively, that the gear shift lever 25 may be attached to the gear shift lever adapter 20 with a suitable fastener or fasteners. The gear shift lever adapter 20 and gear shift lever 25 together form a gear shift lever assembly.

Figure 2:
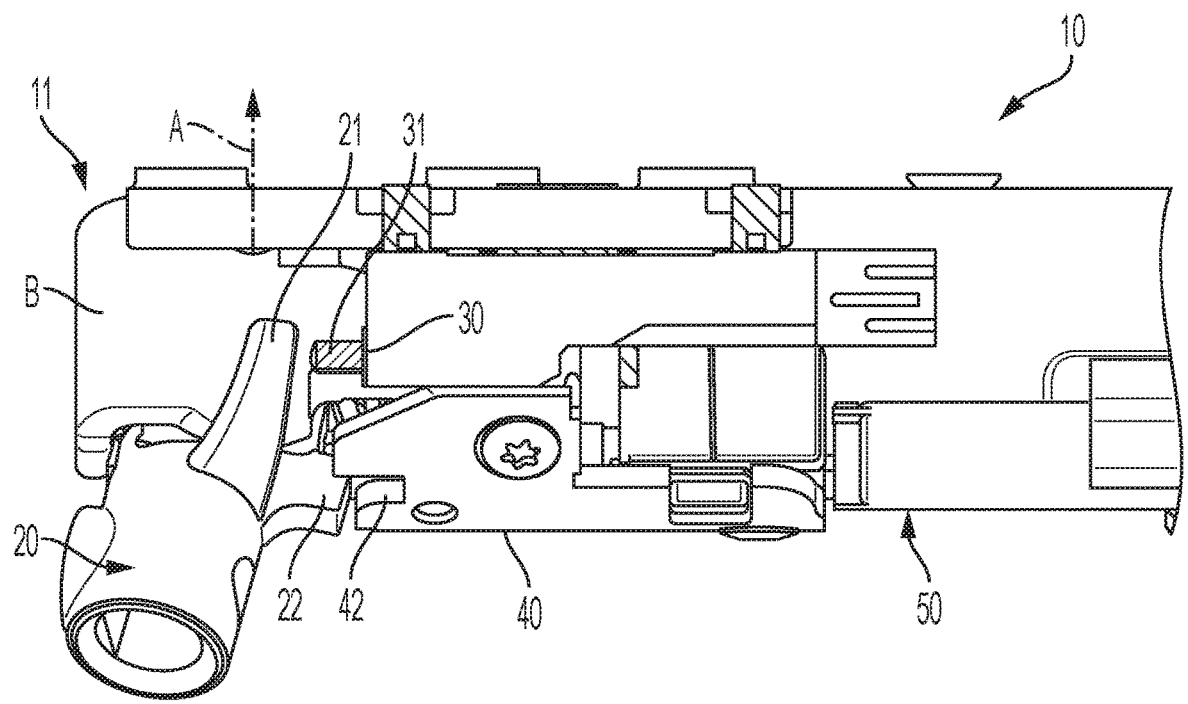
FIG. 2 illustrates the gear shift lock device with the gear shift lever adapter in a shifting position.

The gear shift lever adapter 20 is rotatable about a first axis 'A' between a resting position shown in FIG. 1 and a shifting position shown in FIG. 2. The gear shift lever adapter 20 is urged toward the resting position by a shift lever spring (not shown). In the resting position, the gear shift lever adapter 20 is positively positioned in the selected gear position. The gear shift lever adapter 20 may be rotated between the resting position and shifting position while being maintained in the selected gear position. For example, the gear shift lever adapter 20 may be rotated between the resting position and shifting position while it remains in the "park" position.

With reference to FIG. 2, in the shifting position, the gear shift lever adapter 20 may be rotated about a second axis 13' to a different selected gear position. In an embodiment, the second axis 13' may extend in a longitudinal direction of the gear shift lock device 11. Upon rotation of the gear shift lever adapter 20 to the different selected gear position, the gear shift lever adapter 20 may rotate about the first axis 'A' back to the resting position.

With further reference to FIGS. 1 and 2, the gear shift lever adapter 20 includes an actuator arm 21 and a shift lever pawl 22. The actuator arm 21 is movable with the gear shift lever adapter 20 and is configured to interface with the park position sensor 30 during movement between the resting position and shifting position as further described below. The shift lever pawl 22 is configured to interface with the detent plate 40 to positively position the gear shift lever adapter 20 at the selected gear position.

In an embodiment, the park position sensor 30 includes a plunger 31 that is movable between a retracted position as shown in FIG. 1 and an extended position as shown in FIG. 2. The plunger 31 is normally urged toward the extended position due to a spring force applied from a spring (not shown). With the gear shift lever adapter 20 in the resting position, the actuator arm 21 holds the plunger 31 in the retracted position, as shown in FIG. 1, against the spring force applied from the spring.

With reference to FIG. 2, as the gear shift lever adapter 20 moves away from resting position toward the shifting position, the actuator arm 21 moves away from the park position sensor 30 thereby allowing the plunger 31 to move toward the extended position due to the spring force of the spring. Accordingly, the park position sensor 30 may detect movement of the gear shift lever adapter 20 from the resting position toward the shifting position.

It is understood that the present invention is not limited to the park position sensor 30 described in the embodiment above. For example, the park position sensor 30 may be implemented as a linear sensor, or other sensor that detects movement of the actuator arm 21 between the resting position and the shifting position. Alternatively, the park position sensor 30 may also be a switch that is actuated by movement of the actuator arm between the resting position and the shifting position.

Figure 3:
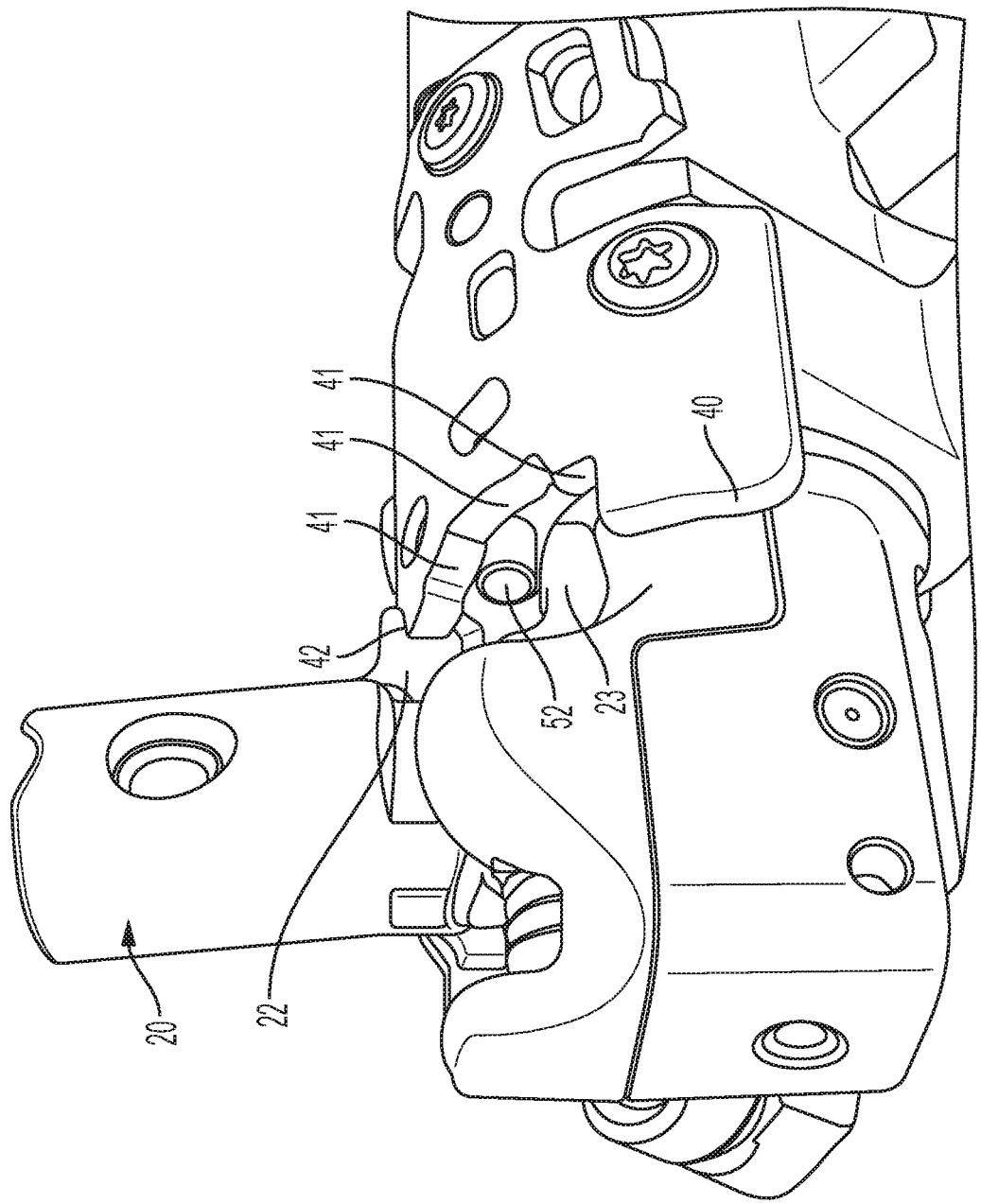
FIG. 3 is a perspective view showing the gear shift lever adapter inhibited against movement by a lock solenoid.

With reference to FIGS. 1-3, the detent plate 40 includes a plurality of detents 41 corresponding to different selected gear positions. For example, the detent plate 40 includes a park position detent 42 that corresponds to a "park" gear of the vehicle transmission. The detents 41 are configured to receive the shift lever pawl 22 of the gear shift lever adaptor 20 to positively position the gear shift lever adapter 20 in the selected gear position.

As noted above, the gear shift lever adapter 20 is urged toward the resting position. In the resting position, as shown in FIG. 1, for example, the shift lever pawl 22 abuts the detent plate 40 in one of the detents 41. As the gear shift lever adapter 20 is moved from the resting position toward the shifting position, the shift lever pawl 22 moves away from the detent plate 40. In the shifting position, the shift lever pawl is moved to a position clear of the park position detent 42 so that the gear shift lever adapter may be rotated about the second axis 'B' to a different selected gear position.

With reference to FIGS. 3-6, the gear shift lever adapter 20 further includes a locking tab 23 extending therefrom. In an embodiment, the locking tab 23 is positioned closer to the first axis 'A' than the shift lever pawl 22. The locking tab 23 interacts with the lock solenoid 50 to inhibit movement of the gear shift lever adapter 20 from the park position until predetermined conditions are satisfied.

In an embodiment, the lock solenoid 50 is a brake transmission interlock (BTSI) solenoid that is configured to inhibit movement of the gear shift lever adapter 20 from the park position. In an embodiment, the lock solenoid 50 inhibits movement of the gear shift lever adapter 20 from the park position by inhibiting movement of the gear shift lever adapter 20 from the resting position completely to the shifting position. The lock solenoid 50 includes a body 51 (also may be referred to herein as a housing) and a lock pin 52 received within the body 51. The lock pin 52 is moveable between a first position and a second position.

Figure 4:
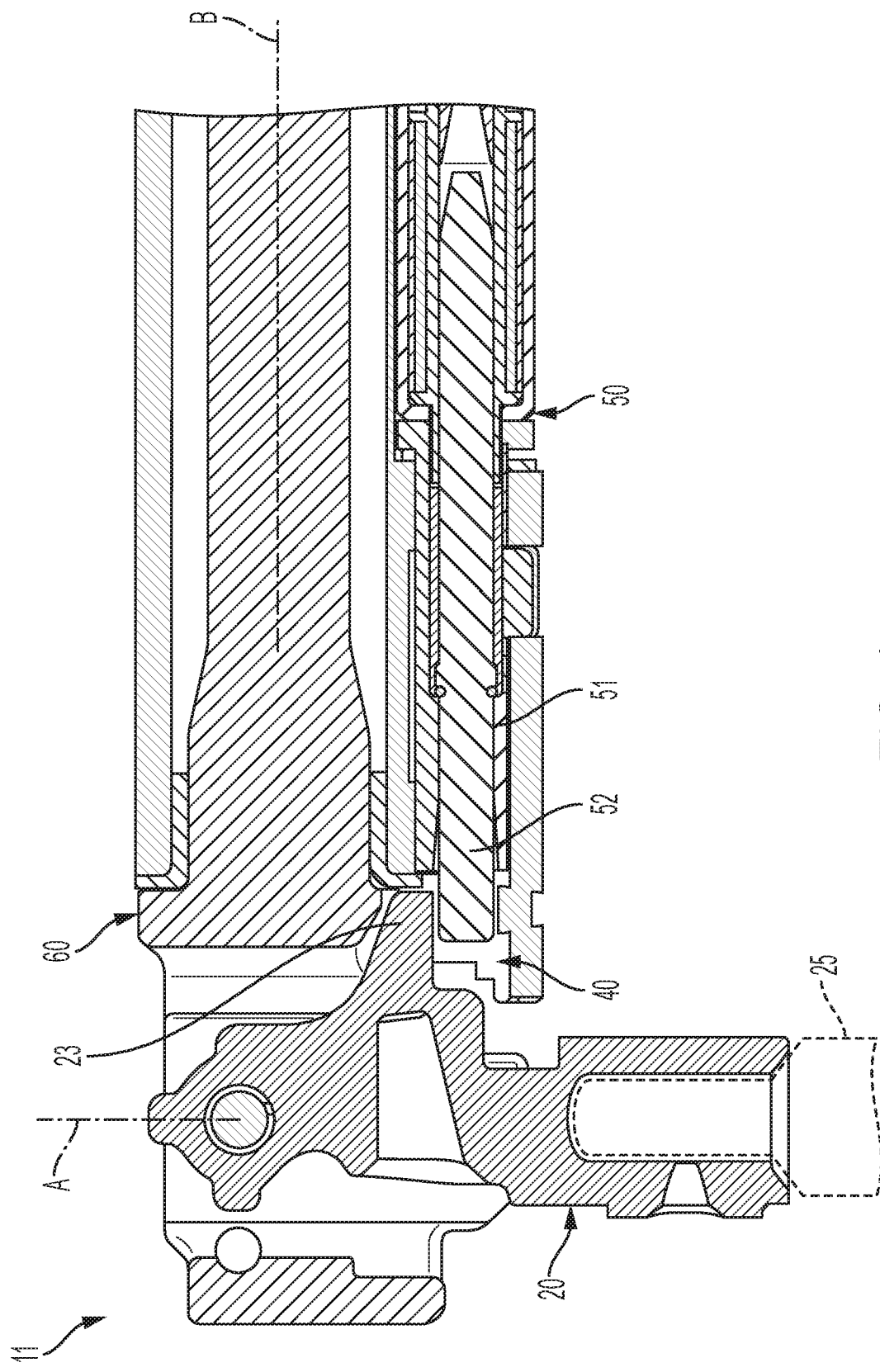
FIG. 4 is a sectional view of the gear shift lock device with a lock solenoid in a locked condition.
Figure 5:
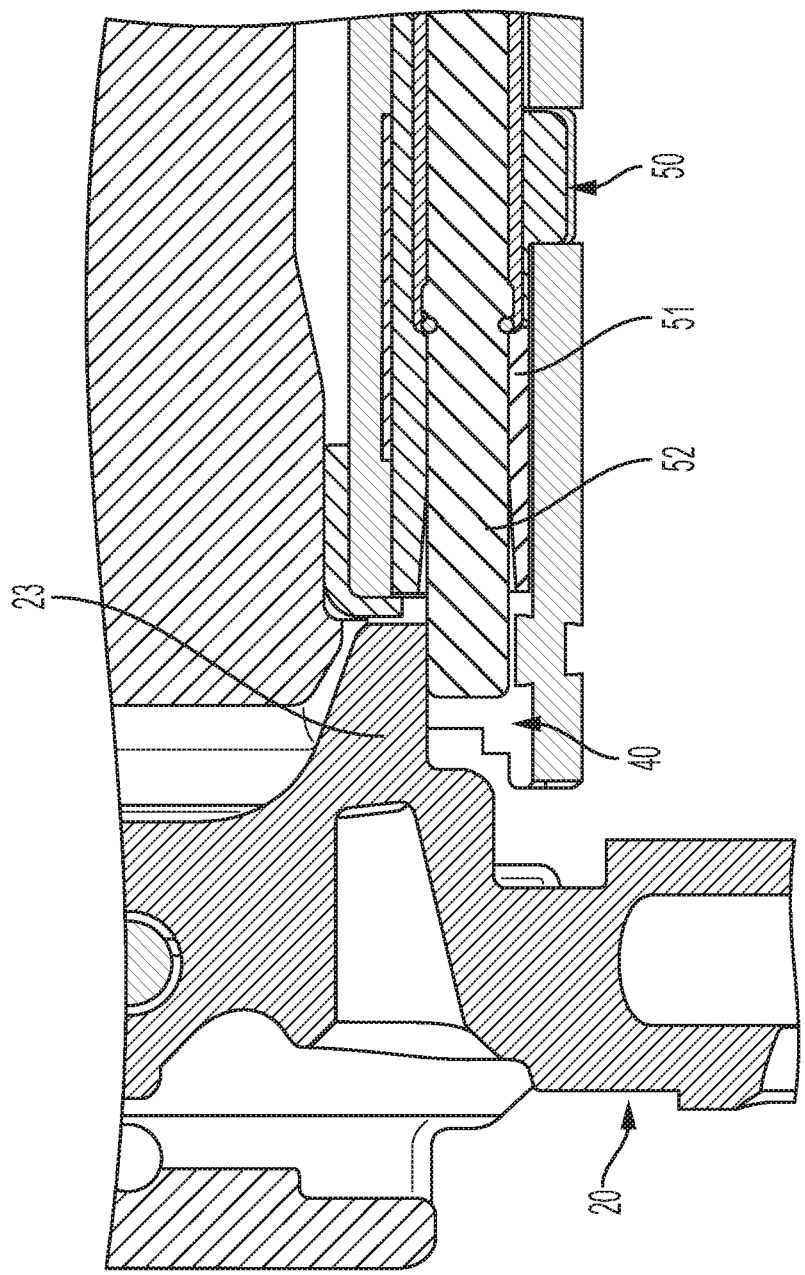
FIG. 5 is a sectional view of the gear shift lock device with the lock solenoid inhibiting movement of the gear shift lever adapter.
Figure 6:
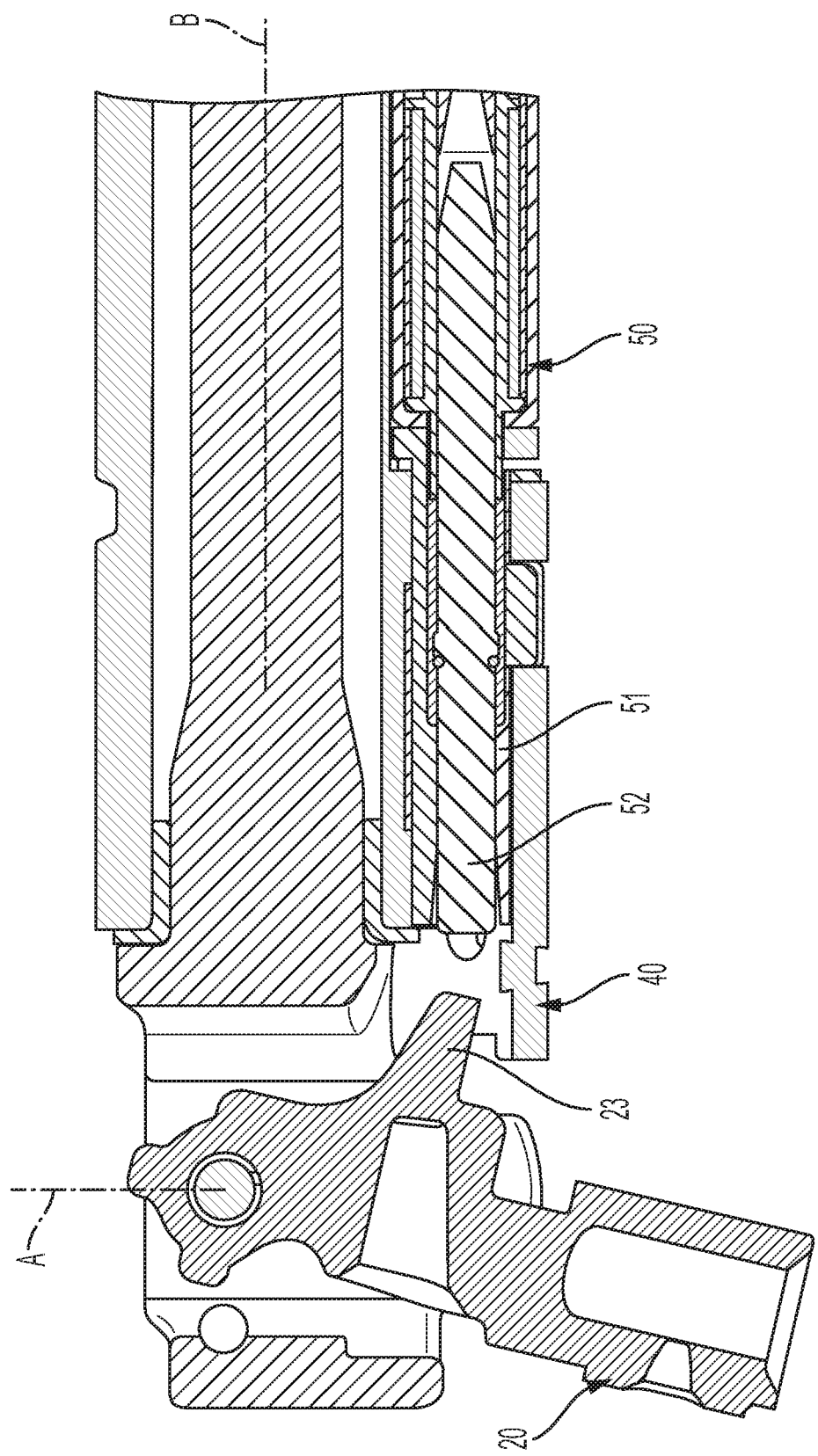
FIG. 6 is a sectional view of the gear shift lock device with the lock solenoid in an unlocked condition.

In an embodiment of the present invention, and with reference to FIGS. 4 and 5, the first position of the lock pin 52 corresponds to a position where the lock pin 52 extends from the lock body 51. The lock pin 52 is spaced from the locking tab 23 when the gear shift lever adapter 20 is in the resting position. When an operator attempts to move the gear shift lever (not shown) from the resting position to the shifting position, with the gear shift lever adapter 20 in the park position, the locking tab 23 moves into contact with locking pin 52 in the first, extended, position, thereby inhibiting further movement of the gear shift lever adapter 20 toward the shifting position. Accordingly, with the lock pin 52 in the first position and the gear shift lever adapter 20 in the park position, the lock solenoid 50 is in a locked condition. The first position may be referred to herein as an extended position, a locked position, or a combination thereof.

The lock pin 52 is configured to be actuated between the first position and the second position. In an embodiment, and with reference to FIG. 5, the second position of the lock pin 52 corresponds to a position where the lock pin 52 is retracted into the body 51 of the lock solenoid 50. In the second position, the lock pin 52 is retracted so that sufficient clearance is provided for the locking tab 23 of the gear shift lever adapter 20 to move past the lock pin 52 when moving from the resting position to the shifting position. Accordingly, with the lock pin 52 in the second position the gear shift lever adapter 20 in the park position, the lock solenoid 50 is in an unlocked condition. The second position may be referred to herein as a retracted position, a unlocked position, or a combination thereof.

The gear shift lever adapter 20 is operably connected to a shift actuator shaft 60. In an embodiment, the shift actuator shaft 60 extends in a longitudinal direction along the second axis 13' and rotates as the gear shift lever and gear shift adapter 20 rotate about the second axis 13' between different gear positions. The shift actuator shaft 60 is operably connected to the vehicle transmission to shift gears of the transmission in response to movement of the gear shift lever to different gear positions.

Figure 7:
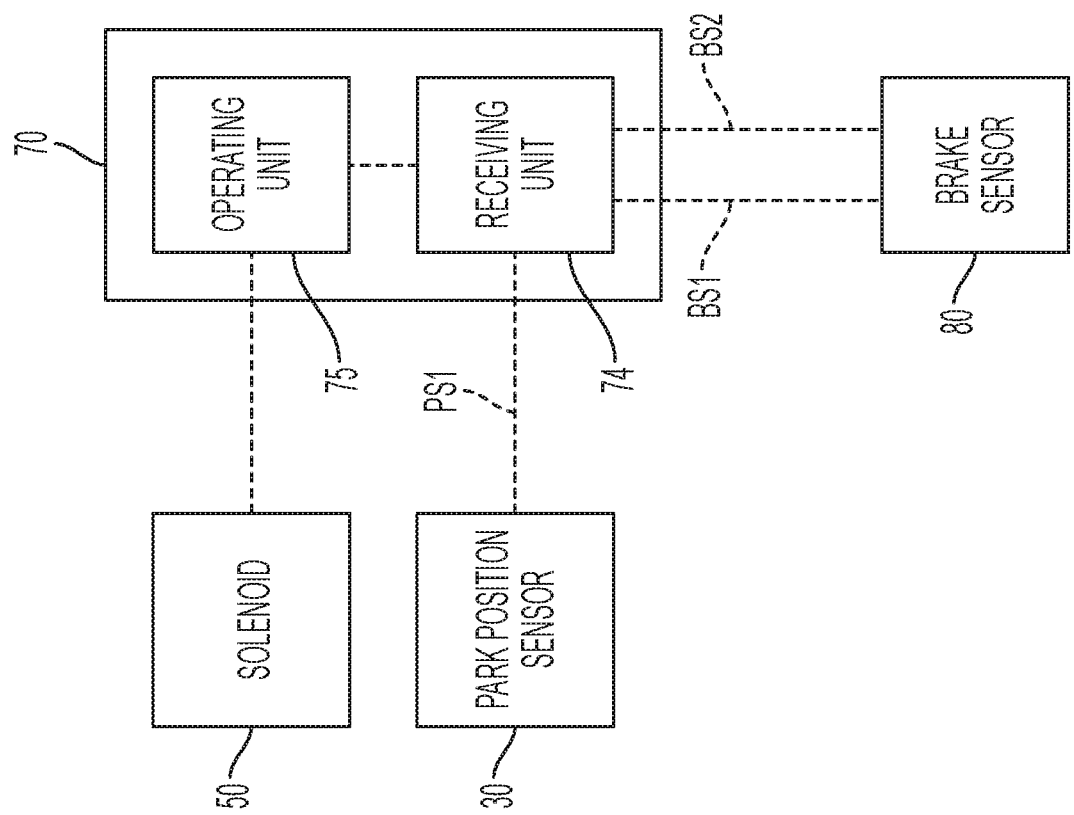
FIG. 7 is a diagram illustrating communication between a gear shift lock device, controller and brake sensor.

With reference to FIG. 7, the gear shift lock system 10 further includes a controller 70. The controller 70 is operably and communicably connected to the gear shift lock device 11. In an embodiment, the controller 70 is operably and communicably connected to the lock solenoid 50 such that the controller may control operation of the lock solenoid 50. The controller 70 may be positioned on the gear shift lock device 11 or remotely therefrom.

Figure 8:
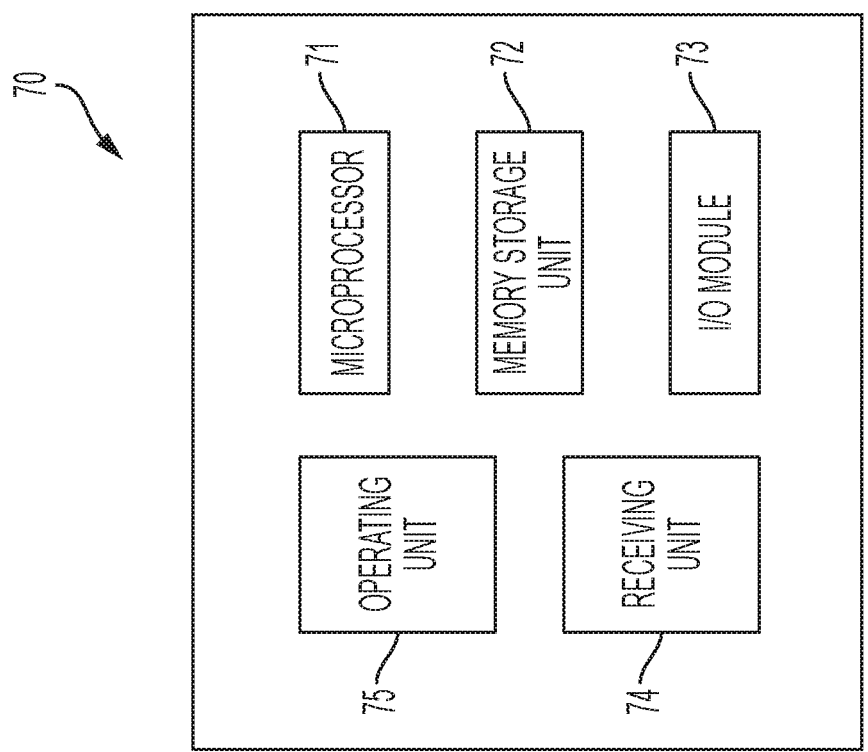
FIG. 8 is a diagram illustrating a controller for operating a lock solenoid.

With reference to FIG. 8, the controller 70 includes a microprocessor 71, memory storage unit 72, and an Input/Output (I/O) module 73. The memory storage device 72 stores program instructions to be executed by the microprocessor 71. It is understood that the microprocessor 71, memory storage unit 72 and I/O module 73 may be formed as a single unit or separately from one another. In an embodiment where the microprocessor 71, memory storage unit 72 and I/O module 73 are formed separately from each other, they are operably and communicably connected to one another. It is also understood that the controller 70 is not limited to the components above and may include additional components.

The controller 70 is operably and communicably connected to a plurality of sensors and/or switches associated with various vehicle components. In an embodiment, as shown in FIG. 7, the controller 70 is operably and communicably connected to a brake sensor 80 and the park position sensor 30 described above.

In an embodiment, the controller 70 further includes a receiving unit 74 and an operating unit 75. The receiving unit 74 is configured to receive signals from various sensors and/or switches, such as the park position sensor 30 and a brake sensor 80, as described below. The operating unit 75 is configured to communicate with the lock solenoid 50 so as to control operation of the lock solenoid 50.

The brake sensor 80 is configured to detect when a brake pedal of the vehicle is depressed. In response to detecting that the brake pedal is depressed, the brake sensor 80 transmits a first brake signal BS1 to the receiving unit 74 of the controller 70. In response to receiving the first brake signal BS1, the controller 70 determines that brake pedal is depressed.

In an embodiment, the brake sensor may continually transmit the first brake signal BS1 at predetermined intervals while the brake pedal is depressed. In this example, the brake sensor 80 stops transmitting the first brake signal BS1 when the brake pedal is released. Accordingly, the controller 70 determines that the brake pedal is not depressed when first brake signal BS1 is no longer received.

Alternatively, the brake sensor 80 may transmit the first brake signal BS1 when the brake pedal is depressed, and transmit a second brake signal BS2 when the brake pedal is released. Accordingly, in response to receiving the second brake signal BS2, the controller 70 determines that the brake pedal is not depressed.

Further, the above operations may be used together, such that the first brake signal BS1 is continually transmitted to the controller 70 while the brake pedal is depressed and the second brake signal BS2 is transmitted to the controller 70 when the brake pedal is released. It is understood that the above configurations are provided for the purpose of example, and that other suitable configurations to determine when the brake pedal is depressed may be employed.

The brake sensor 80 may be any suitable sensor to detect depression of a brake pedal. For example, the brake sensor 80 may be a normally closed switch actuated upon depression of the brake pedal or movement of the gear shift lever, a pressure switch, a hall effect sensor or a touch sensor. It is understood that the examples above are non-limiting and other suitable sensors may be employed as well.

The controller 70 controls operation of the lock solenoid 50 and lock pin 52 based on signals received from the brake sensor 80 and the park position sensor 30. In an embodiment, if the controller 70 receives a signal from the park position sensor 30 that the gear shift lever adapter 20 has been or is being moved from the resting position toward the shifting position while the brake sensor 80 indicates that the brake pedal is depressed, the controller 70 will operate the lock solenoid 50 to retract the lock pin 52 so that the gear shift lever adapter 20 may be moved to the shifting position where it can be rotated about the second axis 13' out of the park position.

In operation, with the gear shift lever adapter 20 in the park position, the gear shift lever adapter 20 is normally inhibited from movement completely to the shifting position from the resting position by the lock pin 52 as shown in FIG. 5. During movement of the gear shift lever adapter 20 from the resting position toward the shifting position, the locking tab 23 of the gear shift lever adapter 20 comes into contact with the lock pin 52, thereby inhibiting complete movement to the shifting position, as shown in FIG. 5. The shift lever pawl 22 remains in the park position detent 42 thereby retaining the gear shift lever adapter 20 in the park position.

To move the gear shift lever adapter 20 to the shifting position so that it may be shifted from the park position, an operator of the vehicle depresses the brake pedal. The brake sensor 80 senses the depression of the brake pedal and transmits and the first brake signal BS1 to the receiving unit 74 of the controller 70 as shown in FIG. 7. In response to receiving the first brake signal BS1, the controller 70 determines that the brake pedal is depressed. This determination may be made by either the receiving unit 74 or the operating unit 75.

With the brake pedal depressed, the operator moves the gear shift lever, and thus the gear shift lever adapter 20, from the resting position toward the shifting position as shown in FIG. 2. When moving from the resting position toward the shifting position, the actuator arm 21 moves away from the park position sensor 30, allowing the plunger 31 to extend from the park position sensor 30. A position sensor signal PS1 is transmitted to the receiving unit 74 of the controller 70 indicating that the plunger 31 is extending from the park position sensor 30 as shown in FIG. 7.

In response to receiving the position sensor signal PS1 indicating that the actuator arm 21, and thus the gear shift lever adapter 20, is moving toward to the shifting position while the brake pedal is depressed, the operating unit 75 of the controller 70 operates the lock solenoid 50 to retract the lock pin 52 from the first, extended position to the second, retracted position. With the lock pin 52 in the second, retracted position, the gear shift lever adapter 20 may be rotated beyond the lock solenoid 50 to the shifting position where the shift lever pawl 22 exits the park position detent 42. In the shifting position, the gear shift lever adapter 20 may be rotated about the second axis 'B' to a different selected gear position.

Figure 9:
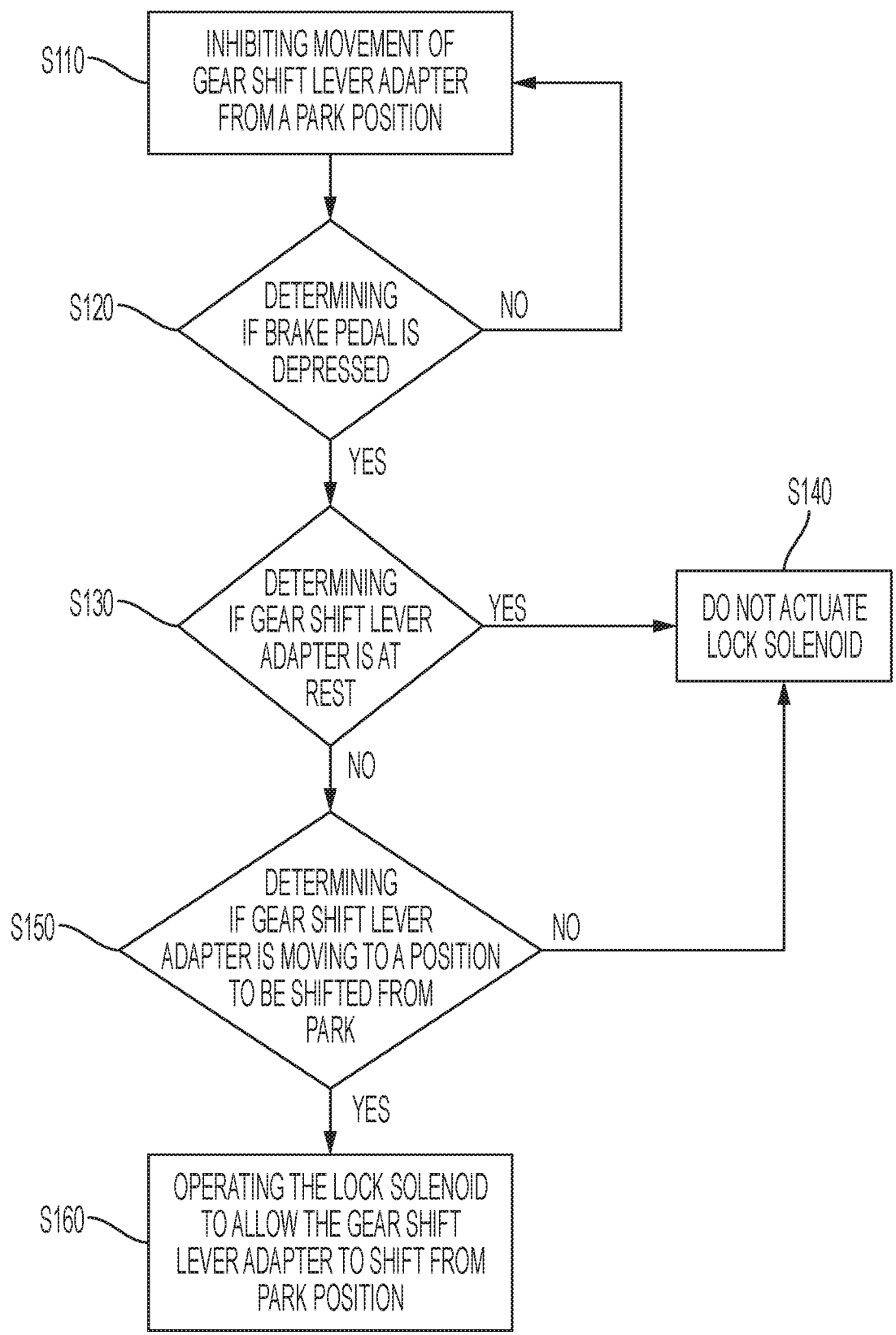
FIG. 9 is diagram illustrating a method actuating a lock solenoid.

According to an embodiment, and with reference to FIG. 9, a method of operating the lock solenoid 50 includes normally inhibiting movement of the gear shift lever adapter 20 from the resting position completely to the shifting position by the controller 70 maintaining the locking pin 52 in the first, extended position at S110. The method further includes determining, by the controller 70, if the brake pedal is depressed at S120. Determining if the brake pedal is depressed includes receiving, at the receiving unit 74 of the controller 70, a first brake signal BS1 from the brake sensor 80 indicating that the brake pedal is depressed. Accordingly, the controller 70 determines that the brake pedal is depressed based on receipt of the first brake signal BS1.

The method further includes determining if the gear shift lever is at rest while the brake pedal is depressed at S130. Determining if the gear shift lever is at rest includes receiving a position sensor signal PS1 from the park position sensor 30. If the position sensor signal PS1 is not received while the brake pedal is depressed, the controller 70 determines that the gear shift lever adapter 20 is at rest and does not actuate the lock solenoid 50 at S140. That is, the controller 70 does not actuate the lock solenoid 50 in response to receiving a signal that the brake pedal is depressed if the gear shift lever adapter 20 is at rest. Conversely, the controller determines that the gear shift lever actuator 20 is not at rest if the controller 70 receives the position sensor signal PS1 from the park position sensor 30.

The method further includes determining, by the controller 70, if the gear shift lever actuator is moving to a position to be shifted from the park position at S150. Determining if the gear shift lever actuator 20 is moving to a position to be shifted from the park position includes receiving, by the receiving unit 74, the position sensor signal PS1 from the park position sensor 30. In an embodiment, the controller 70 may determine if the gear shift lever actuator 20 is moving from the resting position to the shifting position. If the controller 70 determines that the gear shift lever actuator is not moving toward a position to be shifted from the park position, the lock solenoid is not actuated, as shown at S140.

The method further includes operating, by the operating unit 75 of the controller 70, the lock solenoid 50 to retract the lock pin 52 to the second position, so that the lock solenoid 50 is in the unlocked condition, in response to receiving the position sensor signal PS1 from the park position sensor 30 while the brake pedal is depressed, at S160.

If the park sensor signal is received at a time when the brake pedal is not depressed, the controller 70 maintains the lock pin 52 in the first, extended position to inhibit movement of the gear shift lever adapter 20 completely to the shifting position. Thus, the gear shift lever may not be shifted out of the park position.

It is understood that the controller may simultaneously determine whether the gear shift lever adapter 20 is at rest and whether the gear shift lever adapter 20 is moving to a position to be shifted from the park position based on receipt of the position sensor signal PS1 from the park position sensor 30. Further, it is understood that unless described otherwise, the operations performed by the controller 70 may be performed by the receiving unit 74, operating unit 75 or other feature of the controller 70.

The above apparatus and method provide for a lock solenoid that normally inhibits movement of a gear shift lever from a resting position to a shifting position unless the brake pedal is depressed and the gear shift lever is being moved from the resting position toward the shifting position. Accordingly, unnecessary actuation of the lock solenoid when a vehicle operator only depresses the brake may be avoided. As such, undesirable noise caused by actuation of the lock solenoid and strain due to unnecessary actuation of the lock solenoid may be reduced.

Figure 10:
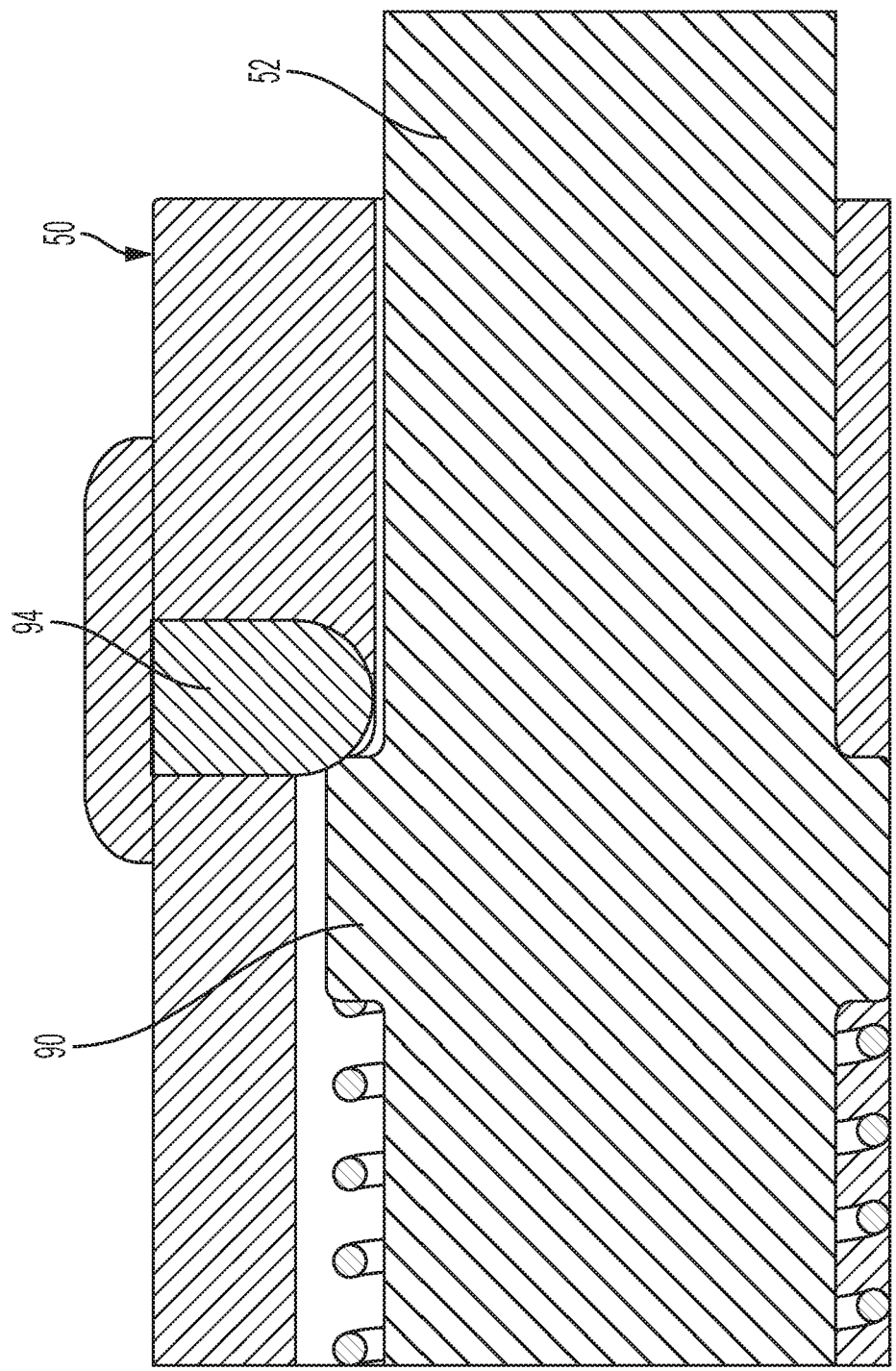
FIG. 10 is an elevational, cross-sectional view of a noise dampener for the lock solenoid.

Referring now to FIG. 10, a portion of the lock solenoid 50 is illustrated in greater detail. In particular, a portion of the lock pin 52 that defines a stop location of the lock pin 52 during operation is illustrated. As described above, the lock pin 52 is in an extended position to define a locked condition. Movement in the extended direction is limited by a radially outwardly protruding portion 90 of the lock pin 52. To provide noise dampening and to avoid damage to the assembly components, at least one bumper 94 protrudes radially inwardly to an extent that ensures a contact limiting surface for the radially outwardly protruding portion 90 of the lock pin 52.

Figure 11:
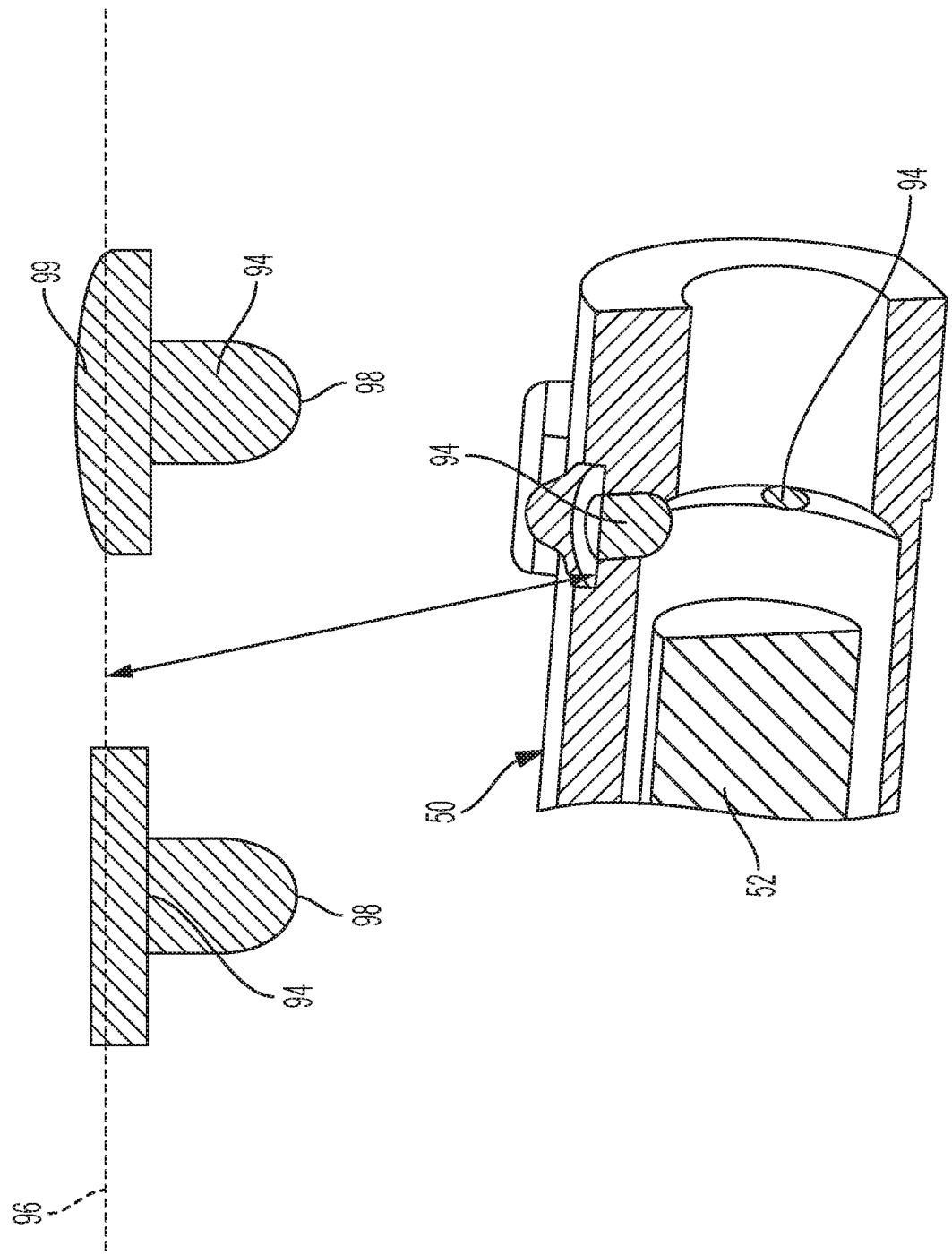
FIG. 11 illustrates two variations of the noise dampener.

In some embodiments, multiple bumpers 94 are provided and circumferentially spaced from each other, as shown in FIG. 11. By way of non-limiting example, three circumferentially spaced bumpers are included. The circumferential spacing of the bumpers 94 may be substantially equidistant (i.e., 120 degrees) or may be spaced in an alternate manner. The bumper(s) 94 may be formed of any resilient material, such rubber or the like.

The bumper(s) 94 are not attached to the lock pin 52 and are fixed in a stationary manner within the lock solenoid 50. In other words, the bumper(s) 94 are secured to the lock solenoid 50—or a solenoid housing—and do not translate during normal actuation of the lock pin 52. Therefore, the bumper(s) 94 are stationary relative to the translational movement of the lock pin 52. The bumper(s) 94 may be fixed to the lock solenoid 50 in any suitable manner. In some embodiments, the bumper(s) 94 are injection molded into a hard durometer plastic housing of the lock solenoid 50 at the desired travel stop position of the lock pin 52 in the extended, locked position of the lock pin 52.

Referring now to FIG. 11, the bumper 94 may be formed of different geometries in various embodiments. Irrespective of the precise geometry of the radially outward portion of the bumper 94, which interacts with the lock solenoid 50 and a mating part interface 96, the radially inner portion of the bumper 94 includes a semi-spherical geometry 98. However, it is to be understood that other geometries at the radially inner portion may be employed. For example, a chamfered (i.e., angled) region may be provided as the contact interface for the lock pin 52.

The bumper 94, most particularly the radially inner portion that is contacted by the lock pin 52 during operation, is considered a primary, internal bumper portion that dampens the energy and noise of the moving lock pin 52. A secondary dampening portion 99 may be present at a radially outward portion of the bumper 94, as represented with numeral 99 in FIG. 11. The secondary dampening portion 99 is proud of the mating part interface 96, as shown in FIG. 11. The secondary dampening portion 99 provides additional, secondary noise dampening for the overall assembly. The bumper 94, including the secondary dampening portion 99, is a single, integrally formed component and is formed of the same material.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A brake transmission shift interlock (BTSI) solenoid comprising:
    a solenoid housing having an inner surface defining a lock pin cavity;
    a lock pin positioned within the lock pin cavity, the lock pin moveable between a first position and a second position; and
    a bumper protruding into the lock pin cavity and stationary relative to the lock pin, the bumper defining the first position of the lock pin.

2. The BTSI solenoid of claim 1, wherein the bumper is fixed to the solenoid housing.

3. The BTSI solenoid of claim 2, wherein the bumper is injection molded to the solenoid housing.

4. The BTSI solenoid of claim 1, wherein the bumper is one of a plurality of bumpers.

5. The BTSI solenoid of claim 4, wherein the plurality of bumpers are circumferentially spaced from each other at a common axial position.

6. The BTSI solenoid of claim 5, wherein the plurality of bumpers are circumferentially spaced from each other in an equidistant arrangement.

7. The BTSI solenoid of claim 5, wherein the plurality of bumpers are circumferentially spaced from each other in a non-equidistant arrangement.

8. The BTSI solenoid of claim 1, wherein the bumper is formed of rubber.

9. The BTSI solenoid of claim 1, wherein the bumper has a radially inner portion that is semi-spherical.

10. The BTSI solenoid of claim 1, wherein the bumper has a secondary dampening portion disposed at a radially outer portion of the bumper.

11. A gear shift lock system comprising:
a gear shift lock device comprising:
  a gear shift lever assembly;
  a solenoid housing having an inner surface defining a lock pin cavity;
  a lock pin positioned within the lock pin cavity, the lock pin moveable between a first position and a second position; and
  a bumper protruding into the lock pin cavity and stationary relative to the lock pin, the bumper defining the first position of the lock pin; and
  a park position sensor configured to detect movement of the gear shift lever assembly;
a brake sensor configured to detect when a brake pedal is depressed; and
a controller connected to a lock solenoid and the brake sensor, the controller configured to move the lock pin from the first position to the second position in response to receiving a first signal from the brake sensor indicating the brake pedal is depressed and a second signal from the park position sensor while the brake pedal is indicated as depressed.

12. The gear shift lock system of claim 11, wherein the bumper is fixed to the solenoid housing.

13. The gear shift lock system of claim 12, wherein the bumper is injection molded to the solenoid housing.

14. The gear shift lock system of claim 11, wherein the bumper is one of a plurality of bumpers.

15. The gear shift lock system of claim 14, wherein the plurality of bumpers are circumferentially spaced from each other at a common axial position.

16. The gear shift lock system of claim 15, wherein the plurality of bumpers are circumferentially spaced from each other in an equidistant arrangement.

17. The gear shift lock system of claim 15, wherein the plurality of bumpers are circumferentially spaced from each other in a non-equidistant arrangement.

18. The gear shift lock system of claim 11, wherein the bumper is formed of rubber.

19. The gear shift lock system of claim 11, wherein the bumper has a radially inner portion that is semi-spherical.

20. The gear shift lock system of claim 11, wherein the bumper has a secondary dampening portion disposed at a radially outer portion of the bumper.

* * * * *